(12) United States Patent
Okura et al.

(10) Patent No.: US 11,171,352 B2
(45) Date of Patent: Nov. 9, 2021

(54) ASSEMBLY DEVICE FOR BATTERY COMPONENT

(71) Applicant: TOYOTA JIDOSHA KABUSHIKI KAISHA, Aichi-ken (JP)

(72) Inventors: Toshinori Okura, Toyota (JP); Tomohiro Ono, Toyota (JP); Yuta Nemoto, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 108 days.

(21) Appl. No.: 16/536,776

(22) Filed: Aug. 9, 2019

(65) Prior Publication Data

US 2020/0006799 A1    Jan. 2, 2020

Related U.S. Application Data

(63) Continuation of application No. 15/791,965, filed on Oct. 24, 2017, now Pat. No. 10,461,355.

(30) Foreign Application Priority Data

Nov. 11, 2016 (JP) .............................. JP2016-220974

(51) Int. Cl.
*H01M 10/04* (2006.01)
*H01M 50/172* (2021.01)
*H01M 10/0525* (2010.01)

(52) U.S. Cl.
CPC ..... *H01M 10/0404* (2013.01); *H01M 50/172* (2021.01); *H01M 10/0525* (2013.01)

(58) Field of Classification Search
CPC combination set(s) only.
See application file for complete search history.

(56) References Cited

U.S. PATENT DOCUMENTS

| 3,822,585 A | 7/1974 | Toback |
| 4,451,980 A | 6/1984 | Shirakawa et al. |
| 5,137,169 A | 8/1992 | Schulz et al. |
| 5,800,942 A | 9/1998 | Hamada et al. |
| 2004/0076882 A1 | 4/2004 | Yosuke et al. |
| 2007/0219670 A1 | 9/2007 | Tanaka et al. |
| 2011/0033737 A1 | 2/2011 | Miyahisa et al. |
| 2011/0117397 A1 | 5/2011 | Choi et al. |
| 2011/0239398 A1 | 10/2011 | Furusawa et al. |

(Continued)

FOREIGN PATENT DOCUMENTS

| CN | 103662947 A | 3/2014 |
| JP | 59-146152 A | 8/1984 |

(Continued)

OTHER PUBLICATIONS

Notice of Allowance dated Jul. 17, 2019 issued by the U.S. Patent and Trademark Office in U.S. Appl. No. 15/791,965.

*Primary Examiner* — Kaity V Chandler
(74) *Attorney, Agent, or Firm* — Sughrue Mion, PLLC (57) ABSTRACT

An assembly device for a battery component proposed herein includes at least one of members that are a positioning pin and a chuck, and a suction machine. There is at least one exhaust passage inside the at least one of the members that are the positioning pin and the chuck. An outer peripheral surface of the at least one of the members that are the positioning pin and the chuck has at least one dust-collecting port to which the at least one exhaust passage opens. The at least one exhaust passage is connected to the suction machine.

8 Claims, 6 Drawing Sheets

(56) References Cited

U.S. PATENT DOCUMENTS

| | | |
|---|---|---|
| 2013/0059188 A1 | 3/2013 | Lu et al. |
| 2015/0086817 A1 | 3/2015 | Chung et al. |
| 2016/0149278 A1 | 5/2016 | Woehrle et al. |
| 2018/0138541 A1 | 5/2018 | Okura et al. |

FOREIGN PATENT DOCUMENTS

| | | |
|---|---|---|
| JP | 2014-61569 A | 4/2014 |
| JP | 2016-105354 A | 6/2016 |
| WO | 2016/087918 A1 | 6/2016 |

ASSEMBLY DEVICE FOR BATTERY COMPONENT

INCORPORATION BY REFERENCE

This is a continuation of U.S. application Ser. No. 15/791,965, filed Oct. 24, 2017 (allowed), which claims priority to Japanese Patent Application No. 2016-220974 filed on Nov. 11, 2016. The entire disclosures of the prior applications are considered part of the disclosure of the accompanying continuation application, and are hereby incorporated herein by reference in its entirety.

BACKGROUND

1. Technical Field

The disclosure relates to an assembly device for a battery component.

2. Description of Related Art

For example, Japanese unexamined Patent Application Publication No. 2016-105354 (JP 2016-105354 A) discloses the structure of a sealed battery. The sealed battery is equipped with an electrode body, a case body that accommodates the electrode body, and a lid body that closes the case body. A positive electrode terminal and a negative electrode terminal are attached to the lid body. Parts of the positive electrode terminal and the negative electrode terminal extend into the case body and are connected to the electrode body.

SUMMARY

By the way, as for the sealed battery as described above, foreign matters such as minuscule metal scraps produced in an assembly process, and the like can be produced. For example, in the case where a positioning pin and a chuck are used in the assembly process, the metal scraps can be produced when assembled members come into contact with the positioning pin and the chuck. As for the sealed battery as described above, the amount of foreign matters such as minuscule metal scraps and the like entering a battery case after being produced in the assembly process is desired to be minimized.

A first aspect of the disclosure relates to an assembly device for a battery component. The assembly device included at least one of members that are a positioning pin and a chuck, and a suction machine. At least one exhaust passage is inside the at least one of the members that are the positioning pin and the chuck, and at least one dust-collecting port to which the at least one exhaust passage opens is in an outer peripheral surface of the at least one of the members that are the positioning pin and the chuck. The suction machine is connected to the at least one exhaust passage. According to this assembly device for the battery component, the positioning pin or the chuck is provided with the at least one dust-collecting port, and minuscule metal scraps are suctioned by the positioning pin or the chuck. Therefore, the minuscule metal scraps that can be produced in an operation of assembling the battery component due to, for example, contact with the positioning pin or the chuck can be effectively removed.

In the first aspect of the disclosure, furthermore, the at least one of the members may be the positioning pin. The positioning pin may be a shaft member, and may include the at least one dust-collecting port and the at least one exhaust passage. The at least one dust-collecting port may open to a tip portion of the positioning pin. Besides, the at least one dust-collecting port may open to a lateral surface of the positioning pin. In this case, the minuscule metal scraps that can be produced in the operation of assembling the battery component can be effectively removed by the positioning pin.

In the first aspect of the disclosure, furthermore, the at least one of the members may be the chuck. The chuck may include a first member and a second member. The first member and the second member may be opposed to each other. The first member may include a first dust-collecting port and a first exhaust passage. The first dust-collecting port may open to a first lateral surface of the first member. The second member may include a second dust-collecting port and a second exhaust passage. The second dust-collecting port may open to a second lateral surface of the second member. The first lateral surface and the second lateral surface may be opposed to each other. In this case, the minuscule metal scraps that can be produced in the operation of assembling the battery component can be effectively removed by the chuck.

In the first aspect of the disclosure, furthermore, the first member may include a first dent in the first lateral surface. The second member may include a second dent in the second lateral surface. The battery component gripped by the chuck may be accommodated in the first dent and the second dent. The first dust-collecting port may open to an outer peripheral surface that defines the first dent. The second dust-collecting port may open to an outer peripheral surface that defines the second dent. Besides, a third dust-collecting port may open to at least one of the first lateral surface and the second lateral surface, at a location different from the first dent and the second dent. In this configuration as well, the minuscule metal scraps that can be produced in the operation of assembling the battery component can be effectively removed by the chuck.

In the first aspect of the disclosure, furthermore, the first lateral surface may include the first dent. The second lateral surface may include the second dent. The battery component that is gripped by the chuck may be accommodated in the first dent and the second dent. The first dust-collecting port or the second dust-collecting port may open to at least one of an outer peripheral surface that defines the first dent and an outer peripheral surface that defines the second dent.

In the first aspect of the disclosure, furthermore, the third dust-collecting port may open to the first lateral surface or the second lateral surface that is located on a tip side of the first member or the second member with respect to the first dent and second dent.

In the first aspect of the disclosure, furthermore, the suction machine may suction air from the at least one dust-collecting port by suctioning air from the at least one exhaust passage.

BRIEF DESCRIPTION OF THE DRAWINGS

Features, advantages, and technical and industrial significance of an exemplary embodiment of the disclosure will be described below with reference to the accompanying drawings, in which like numerals denote like elements, and wherein.

DETAILED DESCRIPTION OF EMBODIMENT

An assembly device for a battery component proposed herein according to one embodiment of the disclosure will be described. As a matter of course, the embodiment of the disclosure described herein is not intended to limit the disclosure in particular. The disclosure is not limited to the embodiment thereof described herein, unless otherwise specified. Besides, the respective drawings are schematic views, and do not necessarily reflect actual products in an authentic manner.

Figure 1:
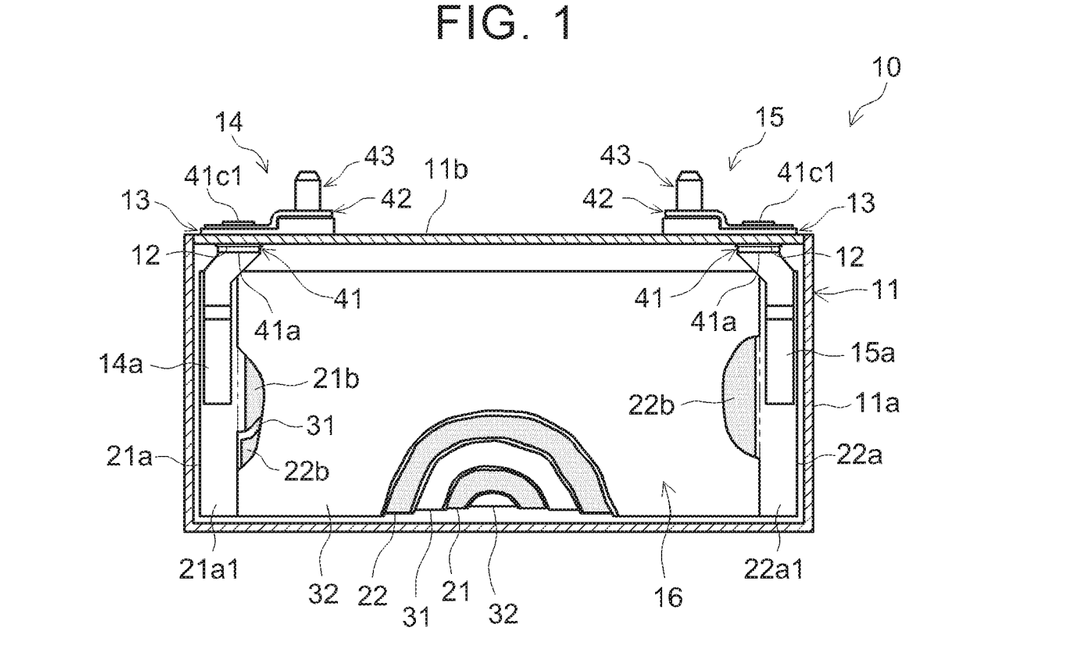
FIG. 1 is a partial cross-sectional view of a sealed battery 10.
Figure 2:
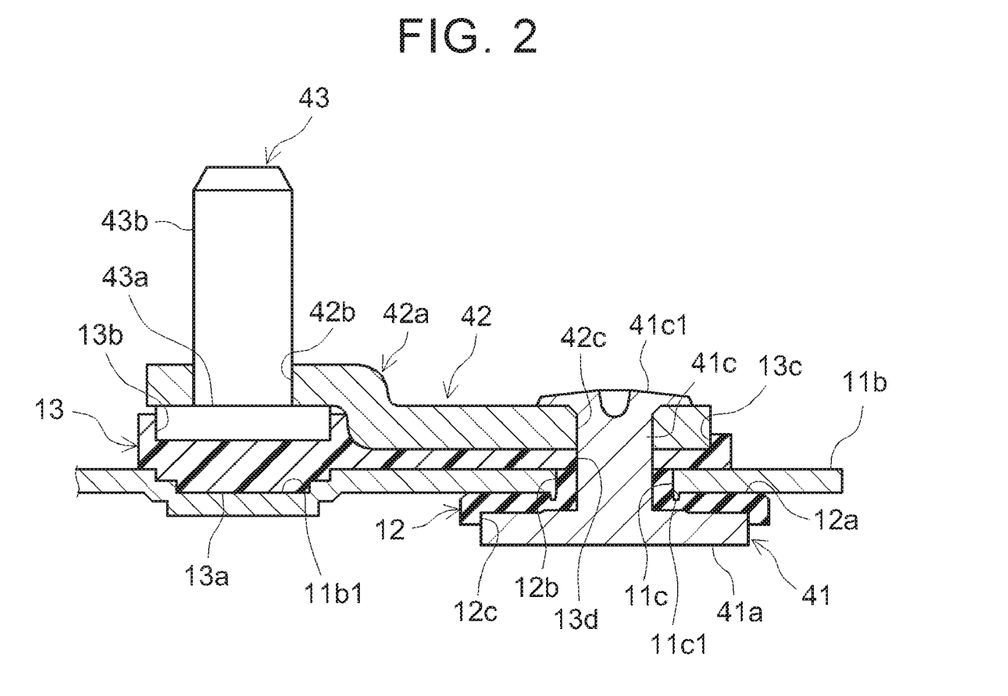
FIG. 2 is a cross-sectional view of a region of a lid body 11b to which a negative electrode terminal 15 is attached.
Figure 3:
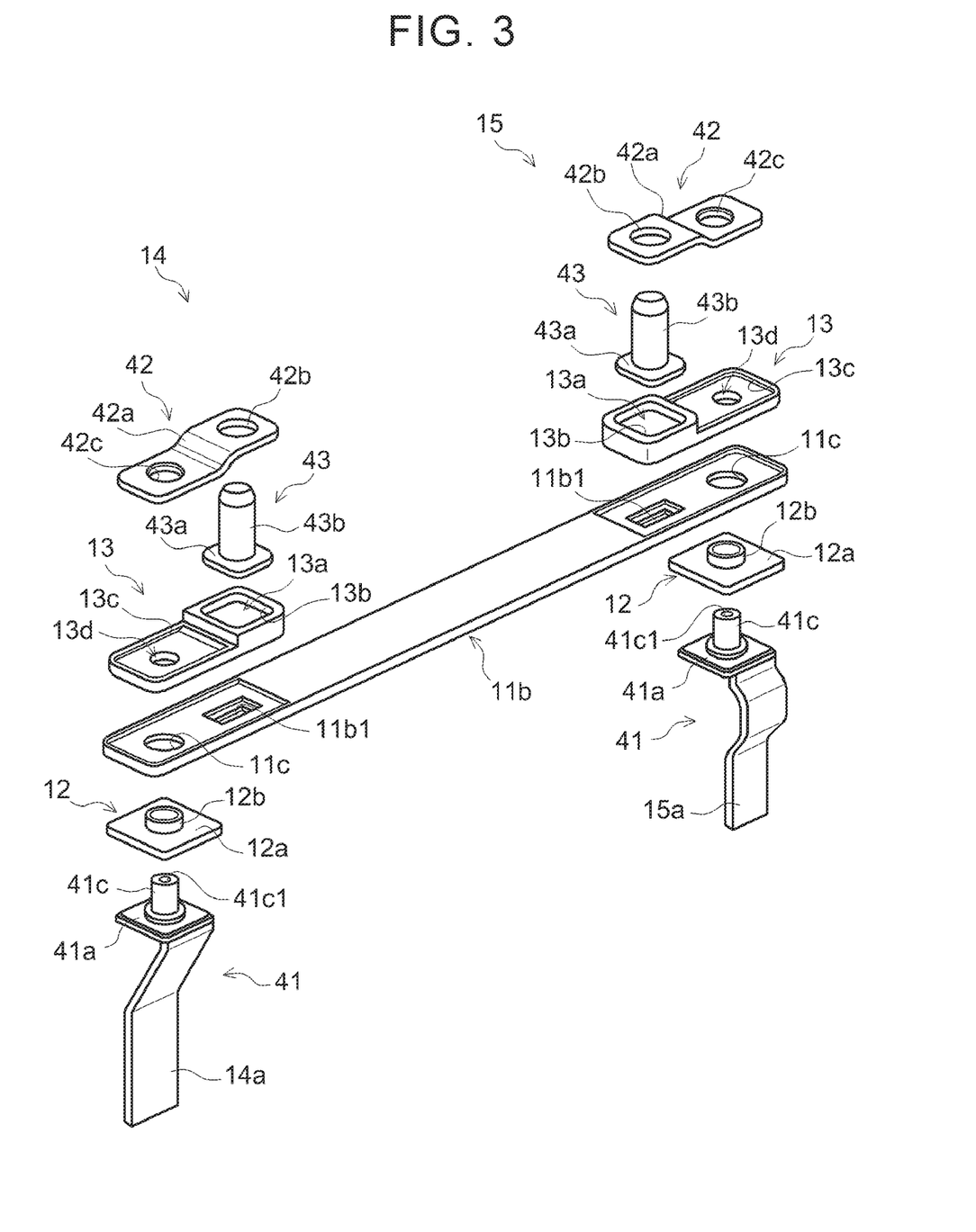
FIG. 3 is an exploded perspective view of the lid body 11b, a positive electrode terminal 14, and the negative electrode terminal 15.

FIG. 1 is a partial cross-sectional view of the sealed battery 10. FIG. 2 is a cross-sectional view of a region of the lid body 11b to which the negative electrode terminal 15 is attached. FIG. 3 is an exploded perspective view of the lid body 11b, the positive electrode terminal 14, and the negative electrode terminal 15. It should be noted herein that the interior of the sealed battery 10 is depicted in an exposed state along a wide surface of a battery case 11 substantially in the shape of a rectangular parallelepiped on one side thereof. FIG. 2 shows a cross-section of the region of the lid body 11b to which the negative electrode terminal 15 is attached, with an intermediate position of the lid body 11b in a short-side direction thereof cut along a long-side direction thereof.

As shown in FIG. 1, the sealed battery 10 is equipped with the battery case 11, insulating materials 12 and 13, the positive electrode terminal 14, the negative electrode terminal 15, and an electrode body 16. The assembly device 100 for the battery component proposed herein is used in a process of, for example, assembling the positive electrode terminal 14 and the negative electrode terminal 15 with the lid body 11b of the battery case 11.

As shown in FIG. 1, the positive electrode terminal 14 and the negative electrode terminal 15 are attached to the battery case 11 via the insulating materials 12 and 13. The electrode body 16 and an electrolytic solution (not shown) are accommodated in the battery case 11. The electrode body 16, which is covered with an insulating film (not shown) or the like, is accommodated in the battery case 11. Therefore, the electrode body 16 is insulated from the battery case 11. The electrode body 16 is equipped with positive electrode elements, negative electrode elements, and separators of the sealed battery 10.

In this embodiment of the disclosure, the electrode body 16 is equipped with positive electrode sheets 21 as the positive electrode elements, negative electrode sheets 22 as the negative electrode elements, and separator sheets 31 and 32 as the separators. The positive electrode sheets 21, the first separator sheets 31, the negative electrode sheets 22, and the second separator sheets 32 are long band-shaped members.

Each of the positive electrode sheets 21 has a positive electrode current-collecting foil 21a (e.g., an aluminum foil) whose width and thickness are determined in advance. A positive electrode active material layer 21b containing a positive electrode active material is formed on both surfaces of the positive electrode current-collecting foil 21a, except at an unformed portion 21a1 that is set with a certain width at one end portion of the positive electrode current-collecting foil 21a in a width direction thereof. In the case of, for example, a lithium-ion secondary battery, the positive electrode active material is a material that can discharge lithium ions in charging the battery and that can absorb lithium ions in discharging the battery, such as a lithium transition metal composite material. In general, various materials other than the lithium transition metal composite material have also been proposed as the positive electrode active material. The positive electrode active material is not limited in particular.

Each of the negative electrode sheets 22 has a negative electrode current-collecting foil 22a (a copper foil in this case) whose width and thickness are determined in advance. A negative electrode active material layer 22b containing a negative electrode active material is formed on both surfaces of the negative electrode current-collecting foil 22a, except at an unformed portion 22a1 that is set with a certain width on one edge of the negative electrode current-collecting foil 22a in a width direction thereof. In the case of, for example, a lithium-ion secondary battery, the negative electrode active material is a material that can occlude lithium ions in charging the battery and that can discharge the lithium ions occluded in charging the battery in discharging the battery, such as natural graphite. In general, various materials other than natural graphite have also been proposed as the negative electrode active material. The negative electrode active material is not limited in particular.

For example, porous resin sheets through which an electrolyte having required heat resistance can pass are used as the separator sheets 31 and 32. Various sheets have also been proposed as the separator sheets 31 and 32. The separator sheets 31 and 32 are not limited in particular.

The negative electrode active material layer 22b is formed, for example, with a wider width than the positive electrode active material layer 21b. The width of the separator sheets 31 and 32 is wider than the width of the negative electrode active material layer 22b. The unformed portion 21a1 of the positive electrode current-collecting foil 21a and the unformed portion 22a1 of the negative electrode current-collecting foil 22a are directed oppositely to each other in the width direction. Besides, the positive electrode sheets 21, the first separator sheets 31, the negative electrode sheets 22, and the second separator sheets 32 are all arranged in a length direction thereof, sequentially superimposed on one another, and wound. The negative electrode active material layer 22b covers the positive electrode active material layer 21b, with the separator sheets 31 and 32 interposed therebetween. The negative electrode active material layer 22b is covered with the separator sheets 31 and 32. The unformed portion 21a1 of the positive electrode current-collecting foil 21a sticks out to one side of each of the separator sheets 31 and 32 in the width direction thereof. The unformed portion 22a1 of the negative electrode current-collecting foil 22a sticks out from the other side of each of the separator sheets 31 and 32 in the width direction thereof.

In the example shown in FIG. 1, the so-called wound-type electrode body 16 is exemplified. The electrode body 16 is not limited to this type. The electrode body 16 may be a so-called laminated-type electrode body. In manufacturing the laminated-type electrode body, a predetermined number of positive electrode sheets, a predetermined number of negative electrode sheets, and a predetermined number of separator sheets are prepared. Each of the positive electrode sheets, the negative electrode sheets, and the separator sheets assumes a shape determined in advance. Then, the positive electrode sheets and the negative electrode sheets are alternately laminated on one another, with the separator sheets interposed therebetween respectively.

In this embodiment of the disclosure, the battery case 11 has a flat square accommodation region, and is equipped with a case body 11a and the lid body 11b. The case body 11a substantially assumes the shape of a flat container as a rectangular parallelepiped, and has an opening through one surface thereof consisting of long sides and short sides. The lid body 11b assumes a shape corresponding to the opening of the case body 11a. The lid body 11b is a plate-like member that is fitted to the opening. The positive electrode terminal 14 and the negative electrode terminal 15 are attached to both lateral portions of the lid body 11b in a longitudinal direction thereof respectively. As shown in FIG. 1, the above-mentioned electrode body 16 is flat along one plane including a winding axis, in such a manner as to be accommodated in the case body 11a of the battery case 11. Then, the unformed portion 21a1 of the positive electrode current-collecting foil 21a is arranged on one side, and the unformed portion 22a1 of the negative electrode current-collecting foil 22a is arranged on the other side, along the winding axis of the electrode body 16. The unformed portion 21a1 of the positive electrode current-collecting foil 21a is welded to an attachment strip 14a of the positive electrode terminal 14 that extends into the battery case 11. The unformed portion 22a1 of the negative electrode current-collecting foil 22a is welded to an attachment strip 15a of the negative electrode terminal 15 that extends into the battery case 11.

In this embodiment of the disclosure, attachment holes 11c for attaching the positive electrode terminal 14 and the negative electrode terminal 15 are formed through both the lateral portions of the lid body 11b in the longitudinal direction thereof, respectively. As shown in FIG. 2, protrusions 11c1 are provided on edges of the attachment holes 11c respectively.

As shown in FIGS. 2 and 3, each of the positive electrode terminal 14 and the negative electrode terminal 15 is equipped with a first terminal 41, a second terminal 42, and a connection terminal 43. The positive electrode terminal 14 and the negative electrode terminal 15 are attached to the lid body 11b, with the insulating materials 12 and 13 interposed therebetween respectively. In this embodiment of the disclosure, the first terminal 41 is a terminal that is fitted to the lid body 11b from inside. The second terminal 42 is a terminal that is fitted to the lid body 11b from outside. A material that can withstand a required potential is used on each of the positive electrode side and the negative electrode side. Therefore, for example, aluminum or aluminum alloy is used for the first terminal 41, the second terminal 42, and the connection terminal 43 of the positive electrode. For example, copper or copper alloy is used for the first terminal 41, the second terminal 42, and the connection terminal 43 of the negative electrode.

The insulating materials 12 and 13 are fitted to the peripheries of the attachment holes 11c respectively. The first insulating materials 12 are arranged inside the lid body 11b to insulate the lid body 11b and the first terminals 41 from each other. In this embodiment of the disclosure, the first insulating materials 12 are configured as resin members having required elasticity. In this embodiment of the disclosure, fluororesin is used for the first insulating materials 12. The first insulating materials 12 are referred to also as gaskets. The sealability of the attachment holes 11c of the lid body 11b is ensured by the first insulating materials 12. In this embodiment of the disclosure, as shown in FIG. 2, each of the first insulating materials 12 has a base portion 12a, a tube portion 12b, and a receiving portion 12c. The base portion 12a is a flat plate-like region that is fitted to an inner lateral surface of the lid body 11b. The tube portion 12b is a region that protrudes from the base portion 12a and that is fitted to an inner peripheral surface of each of the attachment holes 11c of the lid body 11b. The tube portion 12b has an inner diameter corresponding to an outer diameter of a shaft portion 41c that is provided on each of the first terminals 41 as will be described later, such that the shaft portion 41c can be inserted through the tube portion 12b. The receiving portion 12c is provided on a lower surface of each of the first insulating materials 12. The receiving portion 12c has a dent corresponding to the shape of a base portion 41a of each of the first terminals 41.

The second insulating materials 13 are members that are arranged outside the lid body 11b to insulate the lid body 11b from the second terminals 42 and the connection terminals 43. In this embodiment of the disclosure, the second insulating materials 13 are constituted by resin members (polyamide resin in this embodiment of the disclosure), and are referred to also as insulators. In this embodiment of the disclosure, as shown in FIG. 2, a convex portion 13a is provided on a lower surface of each of the second insulating materials 13, in such a manner as to be fitted to a dent 11b1 of the lid body 11b. Besides, a dent 13b in which the connection terminal 43 of the negative electrode is arranged, and a dent 13c to which each of the first terminals 41 is fitted are provided in an upper surface of each of the second insulating materials 13. Besides, a through-hole 13d is formed through the dent 13c to which each of the first terminals 41 is fitted, at a position corresponding to each of the attachment holes 11c that are formed through the lid body 11b. The through-hole 13d has an inner diameter corresponding to the outer diameter of the shaft portion 41c that is provided on each of the first terminals 41 as will be described later, such that the shaft portion 41c can be inserted through the through-hole 13d.

The first terminals 41 are superimposed on the other side of the battery case 11 (the inside in this embodiment of the disclosure), with the first insulating materials 12 interposed therebetween, respectively. As shown in FIGS. 1 and 2, each of the first terminals 41 has the base portion 41a and the shaft portion 41c. The base portion 41a is attached to the lid body 11b via each of the first insulating materials 12. The attachment strip 14a of the above-mentioned positive electrode terminal 14 and the attachment strip 15a of the negative electrode terminal 15 are provided at the base portions 41a of the first terminals 41 respectively.

Each of the connection terminals 43 has a flange portion 43a and a shaft portion 43b. The flange portion 43a is positioned in and fitted to the dent 13b that is provided in each of the second insulating materials 13 that are arranged outside the lid body 11b. Therefore, it is appropriate that this flange portion 43a and this dent 13b assume substantially the same shape. The shaft portion 43b is a region serving as an external output terminal. For example, in constituting an assembled battery, the shaft portion 43b is a region to which a bus bar is attached.

As shown in FIG. 2, each of the second terminals 42 is superimposed on one side of the battery case 11 (the outside in this embodiment of the disclosure), with each of the second insulating materials 13 interposed therebetween. FIG. 3 is a perspective view of the second terminals 42. In this embodiment of the disclosure, each of the second terminals 42 is a member that is arranged on corresponding one of the second insulating materials 13, which are arranged outside the lid body 11b, and that holds each of the connection terminals 43. As shown in FIG. 3, each of the second terminals 42 is a plate-like member that is arranged along the longitudinal direction of the lid body 11b. A step 42a is provided at an intermediate portion of each of the second terminals 42 in the longitudinal direction thereof. A fitting hole 42b that is fitted to the shaft portion 43b of each of the connection terminals 43 is formed through one side of the step 42a. An insertion hole 42c through which the shaft portion 41c of each of the first terminals 41 is inserted is formed through the other side of the step 42a. With each of the second terminals 42 arranged on corresponding one of the second insulating materials 13, the insertion hole 42c is formed at a position corresponding to the through-hole 13d of each of the second insulating materials 13.

The shaft portion 41c of each of the first terminals 41 is inserted through each of the attachment holes 11c of the lid body 11b and the insertion hole 42c of each of the second terminals 42. In this embodiment of the disclosure, the tube portion 12b of each of the first insulating materials 12 is fitted to corresponding one of the attachment holes 11c of the lid body 11b. The shaft portion 41c of each of the first terminals 41 is inserted through the inside of the tube portion 12b. Furthermore, the shaft portion 41c of each of the first terminals 41 is inserted through the through-hole 13d of each of the second insulating materials 13 and the insertion hole 42c of each of the second terminals 42 that are arranged on the second insulating materials 13 respectively. Although not shown in the drawing, a pair of pressurization portions of a press device clamps the first terminals 41 and the second terminals 42 respectively. Thus, the lid body 11b, each of the first insulating materials 12, each of the second insulating materials 13, each of the first terminals 41, and each of the second terminals 42 are in close contact with one another. In this case, as shown in FIG. 2, each of the first insulating materials 12 (the gasket) on the inside of the lid body 11b digs into a protrusion 11c1 that is provided on an edge of each of the attachment holes 11c of the lid body 11b. Thus, high sealability is ensured around the attachment holes 11c of the lid body 11b. Furthermore, a tip 41c1 of the shaft portion 41c is crushed, and is riveted around the insertion hole 42c outside each of the second terminals 42 while being plastically deformed.

As described hitherto, in the operation of assembling the battery case, the positive electrode terminal 14 and the negative electrode terminal 15 are attached to the lid body 11b. Subsequently, the electrode body 16 is attached to the attachment strip 14a of the positive electrode terminal 14 and the attachment strip 15a of the negative electrode terminal 15. The electrode body 16 that is attached to the lid body 11b is accommodated in the case body 11a. Then, the lid body 11b is attached to the opening of the case body 11a, and the case body 11a is closed.

The assembly device 100 for the battery component proposed herein is used in a process in which the positive electrode terminal 14 and the negative electrode terminal 15 are attached to the lid body 11b. The assembly device for the battery component proposed herein will be described herein based on the process in which the positive electrode terminal 14 and the negative electrode terminal 15 are attached to the lid body 11b.

In this embodiment of the disclosure, the case body 11a assumes the shape of a rectangular parallelepiped having an open lateral surface. The lid body 11b is a plate-like member that is fitted to the opening of the case body 11a. The lid body 11b has attachment holes penetrating at positions determined in advance, for example, at positions where the terminals are attached as described above. In the process in which the positive electrode terminal 14 and the negative electrode terminal 15 are attached to the lid body 11b, the shaft portion 41c of each of the first terminals 41 constituting the positive electrode terminal 14 and the negative electrode terminal 15 is inserted through each of the attachment holes 11c that are provided through the lid body 11b.

Figure 4:
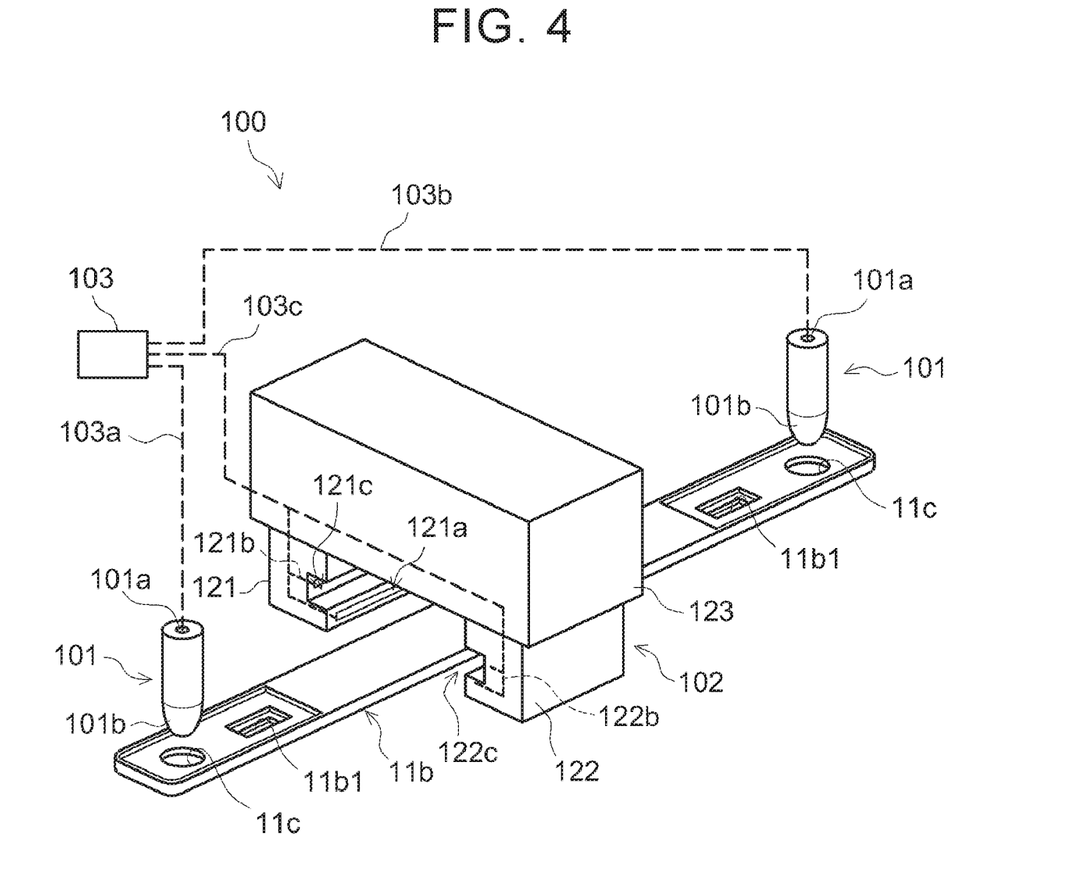
FIG. 4 is a perspective view of an assembly device 100 for a battery component.
Figure 5:
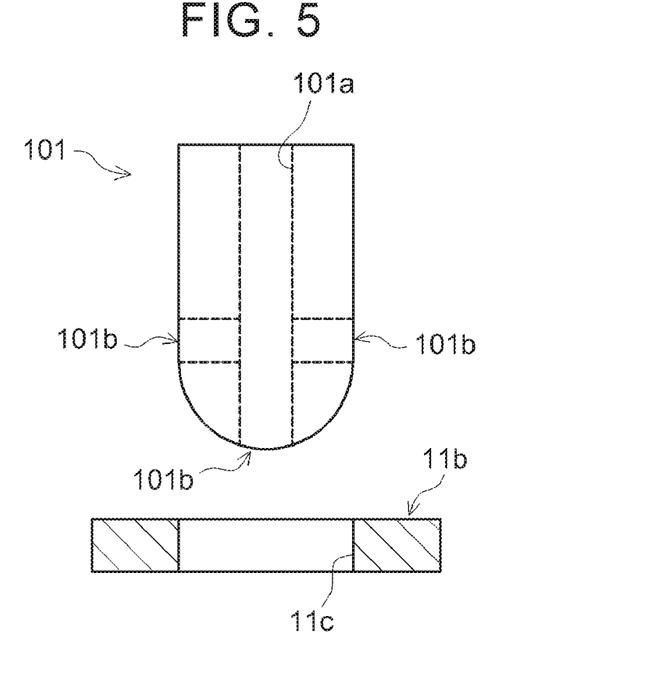
FIG. 5 is a lateral view of each of positioning pins 101.
Figure 6:
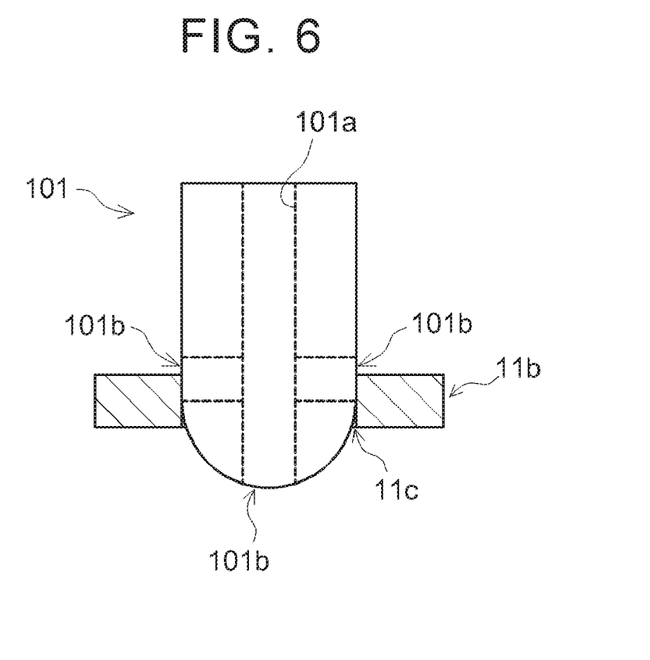
FIG. 6 is another lateral view of each of the positioning pins 101.
Figure 7:
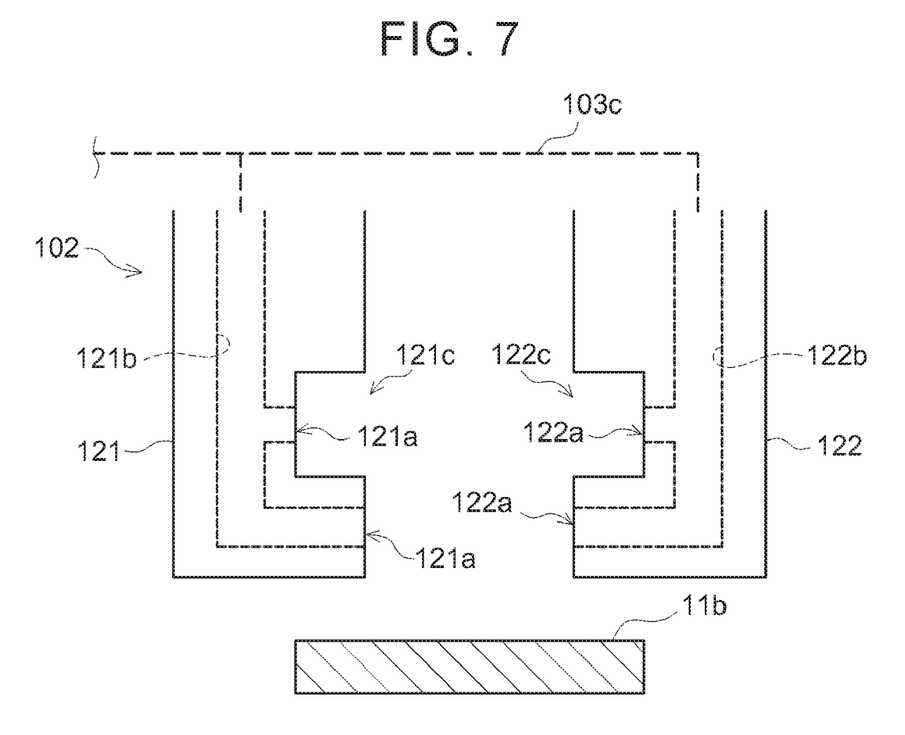
FIG. 7 is a lateral view of a chuck 102.
Figure 8:
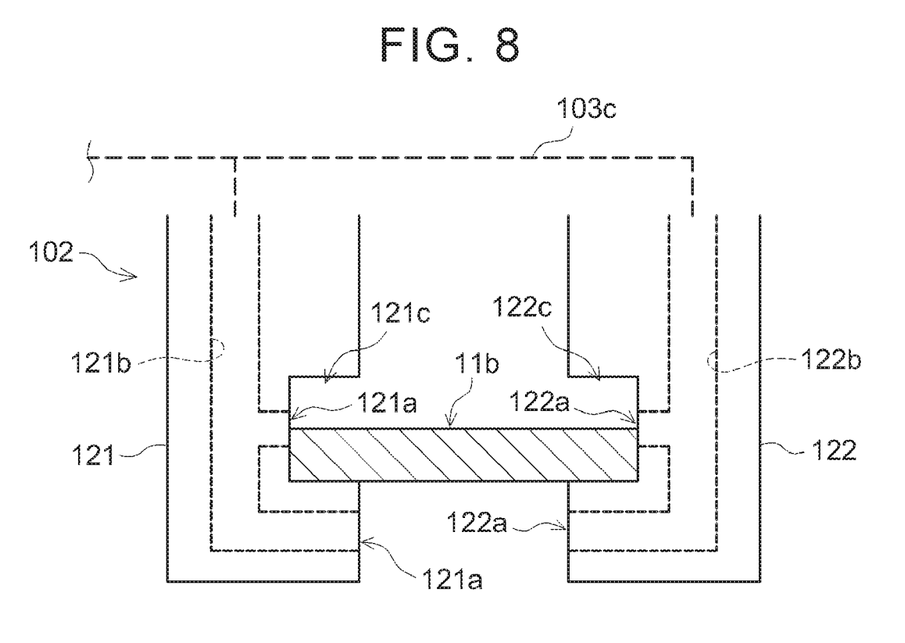
FIG. 8 is another lateral view of the chuck 102.
Figure 9:
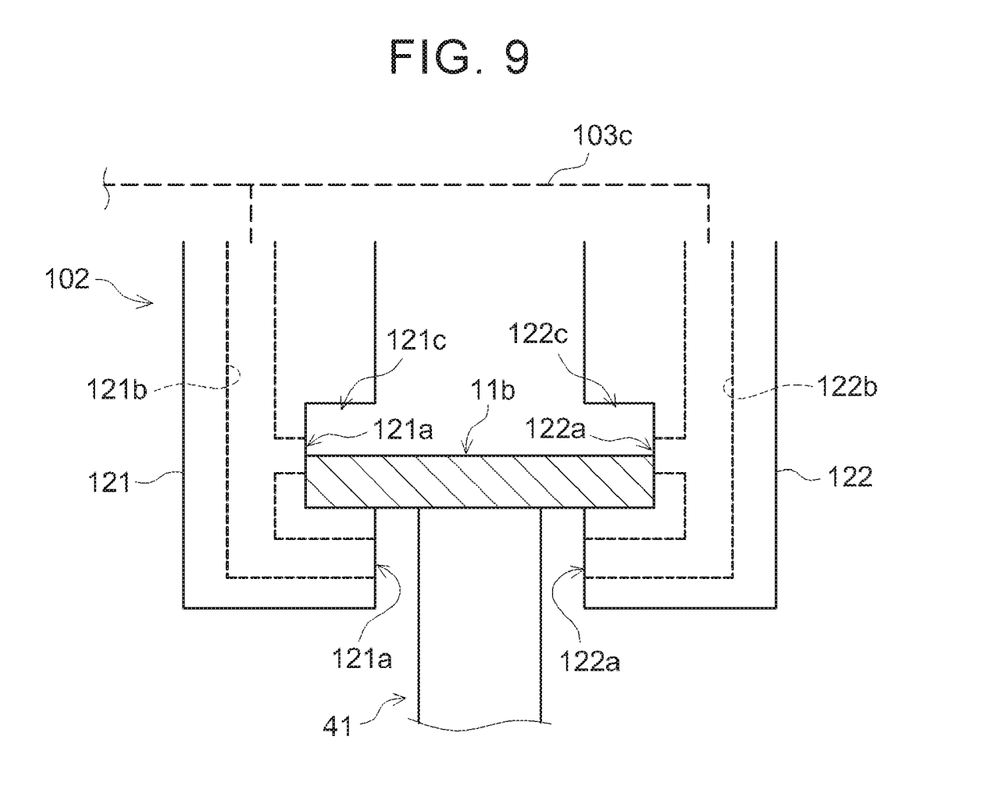
FIG. 9 is still another lateral view of the chuck 102.

FIG. 4 is a perspective view of the assembly device 100 for the battery component. In this embodiment of the disclosure, the assembly device 100 for the battery component is equipped with the positioning pins 101, the chuck 102, and the suction machine 103. FIGS. 5 and 6 are lateral views of each of the positioning pins 101. FIG. 5 shows a state where each of the positioning pins 101 has not been inserted through each of the attachment holes 11c of the lid body 11b. FIG. 6 shows a state where each of the positioning pins 101 has been inserted through each of the attachment holes 11c of the lid body 11b. FIGS. 7 to 9 are lateral views of the chuck 102. FIG. 7 shows a state where the chuck 102 has not gripped the lid body 11b. FIG. 8 shows a state where the chuck 102 has gripped the lid body 11b. FIG. 9 shows a state where a terminal is attached to the lid body 11b gripped by the chuck 102.

As shown in FIG. 4, each of the positioning pins 101 is a shaft member that is inserted through each of the attachment holes 11c that are provided through the lid body 11b. In this embodiment of the disclosure, the attachment holes 11c are formed through the lid body 11b at two locations that are spaced apart from each other in the longitudinal direction, respectively. The two positioning pins 101 are provided in such a manner as to correspond to these attachment holes 11c.

As shown in FIG. 5, each of the positioning pins 101 has an exhaust passage 101a and dust-collecting ports 101b. The exhaust passage 101a is formed inside each of the positioning pins 101. In this embodiment of the disclosure, a cavity serving as the exhaust passage 101a is formed inside each of the positioning pins 101. The exhaust passage 101a is connected to the suction machine 103. The dust-collecting ports 101b are openings of the exhaust passage 101a, and are formed through an outer peripheral surface of each of the positioning pins 101. In this embodiment of the disclosure, the dust-collecting ports 101b are formed through a tip portion of each of the positioning pins 101 and the outer peripheral surface (the lateral surface) of each of the positioning pins 101, respectively. A plurality of the dust-collecting ports 101b may be formed through the outer peripheral surface of each of the positioning pins 101, in a circumferential direction thereof. At least one dust-collecting port 101b may be formed through the outer peripheral surface of each of the positioning pins 101. Preferably, two or more, for example, about three or four dust-collecting ports 101b are formed through the outer peripheral surface of each of the positioning pins 101. In this embodiment of the disclosure, the four dust-collecting ports 101b are homogeneously arranged along the outer peripheral surface of each of the positioning pins 101, in the circumferential direction thereof. Besides, the exhaust passage 101a is connected to the suction machine 103 at a base end portion of each of the positioning pins 101. The suction machine 103 is configured as, for example, a pump. Air is suctioned from the dust-collecting ports 101b through the suction of air from the exhaust passage 101a by the suction machine 103.

As shown in FIG. 4, the chuck 102 is a member that grips the lid body 11b. In this embodiment of the disclosure, the chuck 102 has a first member 121 and a second member 122, which clamp the lid body 11b, and an operation mechanism 123. As shown in FIG. 7, the first member 121 and the second member 122 are opposed to each other. The first member 121 is equipped with a dust-collecting port 121a (a first dust-collecting port) and an exhaust passage 121b (a first exhaust passage). The second member 122 is equipped with a dust-collecting port 122a (a second dust-collecting port) and an exhaust passage 122b (a second exhaust passage). The exhaust passages 121b and 122b are formed inside the first member 121 and the second member 122 respectively. In this embodiment of the disclosure, cavities serving as the exhaust passages 121b and 122b of the first member 121 and the second member 122 are formed. The dust-collecting ports 121a and 122a are openings of the exhaust passages 121b and 122b respectively, and are formed through outer peripheral surfaces of the first member 121 and the second member 122 respectively. In this embodiment of the disclosure, the dust-collecting port 121a opens to a lateral surface (a first lateral surface) of the first member 121 where the first member 121 and the second member 122 are opposed to each other. The dust-collecting port 122a opens to a lateral surface (a second lateral surface) of the second member 122 where the first member 121 and the second member 122 are opposed to each other.

In this embodiment of the disclosure, the first member 121 has a dent 121c (a first dent) in which the lid body 11b is accommodated, in a lateral surface thereof that are opposed to the second member 122. The second member 122 has a dent 122c (a second dent) in which the lid body 11b is accommodated, in a lateral surface thereof that are opposed to the first member 121. The dust-collecting ports 121a and 122a open to bottom portions of the dents 121c and 122c respectively. Furthermore, in this embodiment of the disclosure, other dust-collecting ports 121a and 122a (third dust-collecting ports) also open to lateral surfaces of the first member 121 and the second member 122 that are located on the tip sides with respect to the dents 121c and 122c respectively. As described hitherto, the first member 121 and the second member 122 of the chuck 102 may have the dust-collecting ports 121a and 122a opening to the opposed lateral surfaces thereof respectively, in at least one of the bottom portions of the dents 121c and 122c in which the gripped lid body 11b is accommodated.

The first member 121 and the second member 122 are operated by the operation mechanism 123. Although not shown in the drawing, the operation mechanism 123 is equipped with holding portions that hold the first member 121 and the second member 122 respectively, an opening/closing mechanism that opens/closes the first member 121 and the second member 122, and a distribution pipeline that distributes and connects piping structures from the suction machine 103 to the exhaust passages 121b and 122b of the first member 121 and the second member 122 respectively. Incidentally, in FIG. 4, piping structures 103a to 103c from the suction machine 103 are indicated by broken lines respectively. The piping structures 103a to 103c are connected to the exhaust passage 101a of each of the positioning pins 101 and the exhaust passages 121b and 122b of the chuck 102, respectively.

In gripping the lid body 11b, as shown in FIG. 4, the assembly device 100 for the battery component adjusts the positions of the first member 121 and the second member 122 of the chuck 102 to an intermediate portion of the lid body 11b in the longitudinal direction thereof. Besides, the assembly device 100 for the battery component arranges the positioning pins 101 at predetermined positions with respect to the attachment holes 11c that are formed through the lid body 11b at the two locations that are spaced apart from each other in the longitudinal direction thereof, respectively. Then, as shown in FIG. 8, the assembly device 100 for the battery component grips the intermediate portion of the lid body 11b with the aid of the first member 121 and the second member 122 of the chuck 102. Then, as shown in FIG. 6, the assembly device 100 for the battery component inserts the positioning pins 101 into the attachment holes 11c that are formed through the lid body 11b at the two locations that are spaced apart from each other in the longitudinal direction thereof, respectively. Thus, the positions of the attachment holes 11c that are formed through the lid body 11b at the two locations that are spaced apart from each other in the longitudinal direction thereof respectively are determined. As described above, the tube portion 12b of each of the first insulating materials 12, and the shaft portion 41c of the first terminal 41 of each of the positive electrode terminal 14 and the negative electrode terminal 15 are inserted through each of the attachment holes 11c of the lid body 11b. In this case, the positions of the attachment holes 11c of the lid body 11b are determined by the positioning pins 101 respectively. Furthermore, the tube portion 12b of each of the first insulating materials 12, and the shaft portion 41c of the first terminal 41 of each of the positive electrode terminal 14 and the negative electrode terminal 15 are guided by each of the positioning pins 101. Therefore, the tube portion 12b of each of the first insulating materials 12, and the shaft portion 41c of the first terminal 41 of each of the positive electrode terminal 14 and the negative electrode terminal 15 are likely to be inserted into each of the attachment holes 11c of the lid body 11b.

In this embodiment of the disclosure, as shown in FIG. 5, the dust-collecting ports 101b are formed through the tip portion and outer peripheral surface of each of the positioning pins 101, respectively. Therefore, as shown in FIG. 6, when the positioning pins 101 are inserted into the attachment holes 11c of the lid body 11b respectively, the dust that has adhered to the peripheries of the attachment holes 11c can be removed. For example, when the positioning pins 101 are inserted into the attachment holes 11c respectively, foreign matters that have adhered to the attachment holes 11c and peripheral portions thereof are suctioned by the dust-collecting ports 101b that are formed at the tip portions of the positioning pins 101 respectively. Besides, even in the case where metal scraps are produced when the positioning pins 101 come into contact with the attachment holes 11c, the foreign matters can be removed by the dust-collecting ports 101b that are formed through the outer peripheral surfaces of the positioning pins 101 respectively.

For example, the lid body 11b is made of aluminum, and may be slightly chipped upon coming into contact with the positioning pins 101. Besides, the surfaces of the positioning pins 101 may also be slightly chipped through repeated use. Each of these positioning pins 101 has the dust-collecting ports 101b extending through the outer peripheral surface thereof (the tip portion and outer peripheral surface thereof in this embodiment of the disclosure). The metal scraps thus produced during assembly are immediately suctioned by the dust-collecting ports 101b.

In this embodiment of the disclosure, the dust-collecting ports 101b are formed through both the tip portion and outer peripheral surface of each of the positioning pins 101. The regions where the dust-collecting ports 101b are formed are not limited to those of this configuration. For example, the dust-collecting port 101b may be formed only through the tip portion of each of the positioning pins 101, or the dust-collecting ports 101b may be formed only through the outer peripheral surface of each of the positioning pins 101.

Besides, in this embodiment of the disclosure, as shown in FIG. 7, the chuck 102 has the first member 121 and the second member 122, which clamp the lid body 11b. The first member 121 and the second member 122 are opposed to each other. The first member 121 and the second member 122 are equipped with the dust-collecting ports 121a and 122a and the exhaust passages 121b and 122b respectively. The dust-collecting ports 121a and 122a open to the opposed lateral surfaces of the first member 121 and the second member 122, respectively. The first member 121 and the second member 122 have the dents 121c and 122c in which the lid body 11b is accommodated, in the opposed lateral surfaces thereof, respectively. The dust-collecting port 121a or 122a may be formed in at least one of the dents 121c and 122c. In this embodiment of the disclosure, the dust-collecting ports 121a and 122a are formed through bottoms of the dents 121c and 122c and the opposed lateral surfaces of the first member 121 and the second member 122 which are located on the tip sides with respect to the dents 121c and 122c, respectively.

The dust-collecting ports 121a and 122a are formed through the opposed lateral surfaces of the first member 121 and the second member 122 of the chuck 102, so the foreign matters that have adhered to the lid body 11b can be removed when the chuck 102 clamps the lid body 11b. Besides, as shown in FIG. 8, the dust-collecting ports 121a and 122a are formed through the first member 121 and the second member 122, through the dents 121c and 122c in which the lid body 11b is accommodated, respectively. The dust-collecting ports 121a and 122a are formed through the dents 121c and 122c respectively. Therefore, even in the case where metal scraps are produced when the chuck 102 grips the lid body 11b, the metal scraps can be immediately removed. Besides, as shown in FIG. 9, the dust-collecting ports 121a and 122a are formed through the opposed lateral surfaces of the first member 121 and the second member 122 that are located on the tip sides with respect to the dents 121c and 122c respectively. Foreign matters can also be removed from a lower surface (an inner surface) of the lid body 11b, by these dust-collecting ports 121a and 122a. For example, minuscule foreign matters that are produced when the first terminals 41 are attached to the lid body 11b can be suctioned from the lower surface of the lid body 11b.

In this embodiment of the disclosure, the lid body 11b is made of aluminum. When being gripped by the chuck 102, the lid body 11b may be slightly chipped through contact with the chuck 102. Besides, the surface of the chuck 102 may also be slightly chipped through repeated use. This chuck 102 has the dust-collecting ports 121a and 122a formed through an outer peripheral surface thereof. Therefore, the metal scraps thus produced during assembly can be immediately suctioned.

As described hitherto, the positioning pins 101 and the chuck 102 can immediately suction the metal scraps produced during assembly. An object that is gripped by the chuck 102 will be referred to hereinafter as a work in the present specification. For example, the metal scraps produced in components assembled by the positioning pins 101 and the chuck 102 are unlikely to adhere to the positioning pins 101 and the chuck 102 or to get stuck between the positioning pins 101 and the work or between the chuck 102 and the work. Besides, the metal scraps produced in the components assembled by the positioning pins 101 and the chuck 102 are unlikely to enter other components assembled in a subsequent process, as foreign matters. As described hitherto, according to the assembly device 100 for the battery component proposed herein, the positioning pins 101 and the chuck 102 are provided with the dust-collecting ports 101b, 121a and 122a respectively, so foreign matters are unlikely to get mixed in with the battery that is assembled. Besides, according to the assembly device 100 for the battery component proposed herein, the positioning pins 101 and the chuck 102 are provided with the dust-collecting ports 101b, 121a and 122a respectively, so the produced foreign matters are more effectively prevented from scattering than in the case of an air blow cleaning type in which air is blown onto the work.

It should be noted herein that the wind speeds of the dust-collecting ports 101b of the positioning pins 101 and the dust-collecting ports 121a and 122a of the chuck 102 at the time of suction may be adjusted, for example, such that metal scraps can be appropriately suctioned. For example, in assembling the battery, the suction force may be adjusted such that even minuscule metal scraps with a size of 100 μm can be suctioned. According to the knowledge of the inventor, the wind speeds in the vicinities of inlets of the dust-collecting ports 101b of the positioning pins 101 and the dust-collecting ports 121a and 122a of the chuck 102 may be equal to or higher than about 7 m/s. According to a test conducted by the inventor, all the minuscule metal scraps with a size of about 100 μm could be removed by setting the wind speeds in the vicinities of the inlets of the dust-collecting ports 101b of the positioning pins 101 and the dust-collecting ports 121a and 122a of the chuck 102 equal to or higher than 7 m/s. Besides, a more striking effect of removing foreign matters was obtained than in the case of liquid cleaning in which the assembled work is cleaned by splashing a liquid (water in this case) thereon, by providing the dust-collecting ports 101b of the positioning pins 101 and the dust-collecting ports 121a and 122a of the chuck 102.

The structure of the chuck 102 is not limited to this structure. For example, the object gripped by the chuck 102 is the lid body 11b. However, the object gripped by the chuck 102 is not limited to the lid body 11b. For example, the chuck 102 may grip the first terminals 41 or second terminals 42 that are attached to the lid body 11b. This embodiment of the disclosure discloses the chuck 102 having the first member 121 for gripping the work and the second member 122 for gripping the work. The configuration of the chuck 102 is not limited to this configuration. For example, the chuck 102 may be equipped with three or more members as members for gripping the work. In this case, an exhaust passage and a dust-collecting port may be formed through at least one of the members for gripping the work. Besides, in the above-mentioned embodiment of the disclosure, the first member 121 for gripping the work and the second member 122 for gripping the work are provided with the dents 121c and 122c respectively. It is appropriate that the members of the chuck 102 for gripping the work have the function of gripping the work. The dents 121c and 122c are not absolutely required to be provided. Besides, the dust-collecting ports 121a and 122a may also be arranged at positions suited to remove the dust that has adhered to the work when the chuck 102 performs the operation of gripping the work. Therefore, the disclosure is not limited to the example indicated by the above-mentioned embodiment thereof unless otherwise specified.

The assembly device for the battery component proposed herein has been described in various manners, but the use of one, two or more positioning pins 101 or the use of only the positioning pins 101 or only the chuck 102 is also possible.

Furthermore, the embodiment of the disclosure and example mentioned herein do not limit the disclosure unless otherwise specified.

What is claimed is:

1. An assembly device for a battery component, comprising:
    a positioning pin configured to grip a battery housing, at least one exhaust passage being inside the positioning pin, at least one dust-collecting port to which the at least one exhaust passage opens being in an outer peripheral surface of the positioning pin;
    a suction machine that is connected to the at least one exhaust passage; and
    a chuck configured to grip the battery housing, wherein the chuck includes a first member and a second member,
    the first member and the second member are opposed to each other,
    the first member includes a first dust-collecting port and a first exhaust passage,
    the first dust-collecting port opens to a first lateral surface of the first member,
    the second member includes a second dust-collecting port and a second exhaust passage,
    the second dust-collecting port opens to a second lateral surface of the second member, and
    the first lateral surface and the second lateral surface are opposed to each other.

2. The assembly device for the battery component according to claim 1, wherein
    the at least one dust-collecting port opens to a tip portion of the positioning pin.

3. The assembly device for the battery component according to claim 1, wherein
    the positioning pin is a shaft member and includes the at least one dust-collecting port and the at least one exhaust passage, and
    the at least one dust-collecting port opens to a lateral surface of the positioning pin.

4. The assembly device for the battery component according to claim 1, wherein
    the first member includes a first dent in the first lateral surface,
    the second member includes a second dent in the second lateral surface,
    the battery housing gripped by the chuck is accommodated in the first dent and the second dent, and
    the first dust-collecting port opens to an outer peripheral surface that defines the first dent,
    the second dust-collecting port opens to an outer peripheral surface that defines the second dent.

5. The assembly device for the battery component according to claim 4, wherein
    a third dust-collecting port opens to at least one of the first lateral surface and the second lateral surface, at a location different from the first dent and the second dent.

6. The assembly device for the battery component according to claim 5, wherein
    the third dust-collecting port opens to the first lateral surface or the second lateral surface that is located on a tip side of the first member or the second member with respect to the first dent and the second dent.

7. The assembly device for the battery component according to claim 1, wherein
    the first lateral surface includes a first dent,
    the second lateral surface includes a second dent,
    the battery housing gripped by the chuck is accommodated in the first dent and the second dent, and
    the first dust-collecting port or the second dust-collecting port opens to at least one of an outer peripheral surface that defines the first dent and an outer peripheral surface that defines the second dent.

8. The assembly device for the battery component according to claim 1, wherein
    the suction machine suctions air from the at least one dust-collecting port by suctioning air from the at least one exhaust passage.

* * * * *